(12) United States Patent
Yang et al.

(10) Patent No.: US 11,221,542 B2
(45) Date of Patent: Jan. 11, 2022

(54) ELECTRONIC DEVICE AND LENS MODULE THEREOF

(71) Applicant: CHICONY ELECTRONICS CO., LTD., New Taipei (TW)

(72) Inventors: San-Pen Yang, New Taipei (TW); Cheng-Hun Yang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 16/738,410

(22) Filed: Jan. 9, 2020

(65) Prior Publication Data

US 2020/0363701 A1 Nov. 19, 2020

(30) Foreign Application Priority Data

May 14, 2019 (TW) .................................. 108116627

(51) Int. Cl.
*G03B 17/02* (2021.01)
*G03B 9/10* (2021.01)
*G02B 7/02* (2021.01)

(52) U.S. Cl.
CPC ............... *G03B 17/02* (2013.01); *G02B 7/02* (2013.01); *G03B 9/10* (2013.01)

(58) Field of Classification Search
CPC .................................. G03B 17/02; G03B 7/02
See application file for complete search history.

(56) References Cited

U.S. PATENT DOCUMENTS

| 8,712,233 | B2 | 4/2014 | Gibbs et al. |
| 9,661,197 | B2* | 5/2017 | Clearman ............ G03B 17/561 |
| 10,852,623 | B2* | 12/2020 | Kim ...................... G03B 13/36 |
| 10,884,321 | B2* | 1/2021 | Jerby .................... H04N 5/2251 |
| 2012/0262618 | A1* | 10/2012 | Weakly .................. A45C 11/22 348/333.01 |
| 2014/0071337 | A1 | 3/2014 | Duan et al. |
| 2019/0109166 | A1* | 4/2019 | Ide ..................... H01L 27/14618 |
| 2019/0212637 | A1* | 7/2019 | D'Acquisto ......... F16M 13/022 |
| 2020/0218131 | A1* | 7/2020 | Weng .................. G03B 11/041 |

FOREIGN PATENT DOCUMENTS

| CN | 103676408 A | 3/2014 |
| CN | 203521588 U | 4/2014 |
| CN | 109302557 A | 2/2019 |
| TW | 201412101 A | 3/2014 |

\* cited by examiner

*Primary Examiner* — Clayton E. LaBalle
*Assistant Examiner* — Dennis Hancock
(74) *Attorney, Agent, or Firm* — Muncy, Geissler, Olds & Lowe, P.C.

(57) ABSTRACT

An electronic device includes a first housing, a second housing, an accommodating space and a lens module. The second housing is connected to the first housing and includes an arc edge. The accommodating space is formed between the first housing and the second housing and includes an arc area having a position corresponding to the arc edge. The lens module is located in the accommodating space, matches the shape of the accommodating space, and includes a bottom case, a side case, a top case, an internal space and a photography unit. The side case is connected to the bottom case and includes an inclined surface area which is provided in the arc area. The top case is connected to the side case and includes a top opening.

16 Claims, 7 Drawing Sheets

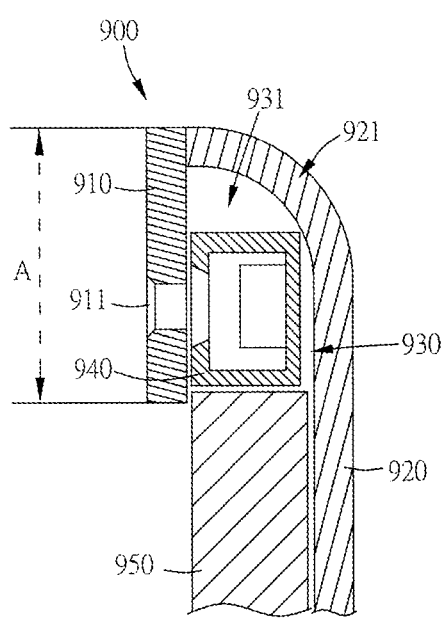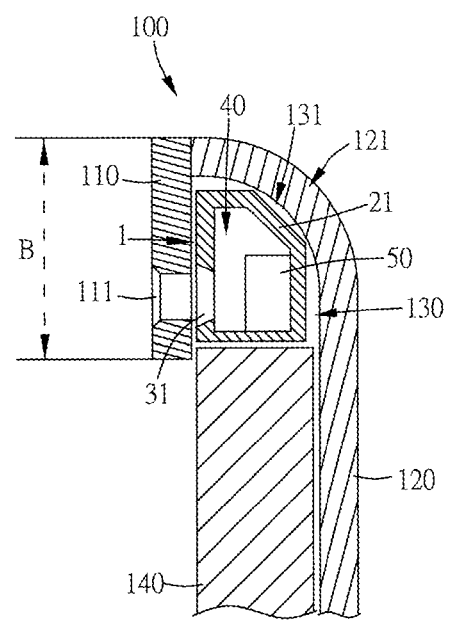
FIG. 1(Prior Art)
FIG. 2

ELECTRONIC DEVICE AND LENS MODULE THEREOF

FIELD OF THE INVENTION

The present invention relates to an electronic device and a lens module thereof, and more particularly to an electronic device and a lens module thereof capable of thoroughly utilizing an internal space of the electronic device and reducing an outer border frame of the electronic device.

DESCRIPTION OF THE PRIOR ART

A common laptop computer is usually provided with a lens at a border frame on a side of the screen such that the lens can photograph a user sitting in front of the screen. Referring to FIG. 1, a laptop computer 900 includes a first housing 910, a second housing 920, an accommodating space 930, a lens module 940 and a screen module 950. The first housing 910 is a case facing one side of a user and includes a through hole 911. The first housing 910 is connected to the second housing 920, and an accommodating space 930 is formed between the first housing 910 and the second housing 920. To satisfy the requirements of a streamlined appearance, the second housing 920 is usually designed to include an arc edge 921 so as to present a simple and sleek look. The screen module 950 is installed between the first housing 910 and the second housing 920. The lens module 940 is provided in the accommodating space 930 and is aligned with the through hole 911 so as to photograph the user through the through hole 911.

In an area on the interior of the accommodating space 930 and near the arc edge 921, an arc area 931 corresponding to the arc edge 921 is also formed. However, the lens module 940, which generally has a rectangular shape, cannot be placed into the arc area 931, so the space of the arc area 931 cannot be properly utilized. In addition, the first housing 910 needs to be designed to have a sufficient first housing length A so as to cover the accommodating space 930 and the lens module 940. Therefore, the proper utilization of the arc area 931 and reduction of the first housing length A so as to achieve an increased screen size is a task worthy of discussion.

SUMMARY OF THE INVENTION

It is a primary object of the present invention to provide an electronic device capable of thoroughly utilizing an internal space of the electronic device and reducing an outer border frame of the electronic device.

To achieve the above object, an electronic device of the present invention includes a first housing, a second housing, an accommodating space and a lens module. The first housing has a through hole. The second housing is connected to the first housing and includes an arc edge. The accommodating space is formed between the first housing and the second housing and includes an arch area having a position corresponding to the arc edge. The lens module is located in the accommodating space and has a shape matching the accommodating space. The lens module includes a bottom case, a side case, a top case, an internal space and a photography unit. The side case is connected to the bottom case and includes an inclined surface area provided in the arc area. The top case is connected to the side case and includes a top opening aligned with the through hole. The internal space is formed between the bottom case, the side case and the top case. The photography unit is located in the internal space and is aligned with the top opening.

According to an embodiment of the present invention, the camera lens further includes at least one power connecting member provided at the side case.

According to an embodiment of the present invention, the side case further includes a bevel angle area, in which the power connecting member is provided.

According to an embodiment of the present invention, the side case further includes a recessed area, in which the power connecting member is provided.

According to an embodiment of the present invention, the side case further has a first short side, the first short side has a first short side center line, and the top opening is deviated from the first short side center line.

According to an embodiment of the present invention, the side case further has a first short side, the first short side has a first short side center line, and the top opening is located on the first short side center line.

According to an embodiment of the present invention, the electronic device further includes a screen module. The screen module is located between the first housing and the second housing and is close to the lens module.

According to an embodiment of the present invention, the lens module further includes an actuator and a blocking piece. The actuator is located in the internal space and can be electrically driven to move along a first direction or a second direction. The blocking piece is located next to the top opening and is linked with the actuator. When the actuator moves along the first direction, the actuator drives the blocking piece to move to a first position to block the photography unit; when the actuator moves along the second direction, the actuator drives the blocking piece to move to a second position such that the photography unit is exposed to an exterior from the top opening.

According to an embodiment of the present invention, the blocking piece further includes a pivotal portion mutually pivotally connected to the top case. The actuator includes a connecting portion connected to the blocking piece. When the actuator is electrically driven and drives the blocking piece, the actuator is capable of rotating between the first position and the second position relative to the top case.

It is another object of the present invention to provide a lens module capable of thoroughly utilizing an internal space of an electronic device and reducing an outer border frame of the electronic device.

To achieve the above object, a lens module of the present invention is applied in an electronic device. The electronic device includes a first housing, a second housing and an accommodating space. The first housing has a through hole. The second housing is connected to the first housing and includes an arc edge. The accommodating space is formed between the first housing and the second housing and includes an arch area having a position corresponding to the arc edge. The lens module is located in the accommodating space and has a shape matching the accommodating space. The lens module includes a bottom case, a side case, a top case, an internal space and a photography unit. The side case is connected to the bottom case and includes an inclined surface area provided in the arc area. The top case is connected to the side case and includes a top opening aligned with the through hole. The internal space is formed between the bottom case, the side case and the top case. The photography unit is located in the internal space and is aligned with the top opening.

BRIEF DESCRIPTION OF THE DRAWINGS

FIG. 1 is a partial section diagram of a laptop computer of the prior art;

FIG. 2 is a partial section diagram of an electronic device according to a first embodiment of the present invention;

DETAILED DESCRIPTION OF THE EMBODIMENTS

To enable the Examiner to better understand the technical contents of the present invention, preferred embodiments are described as below.

Figure 3:
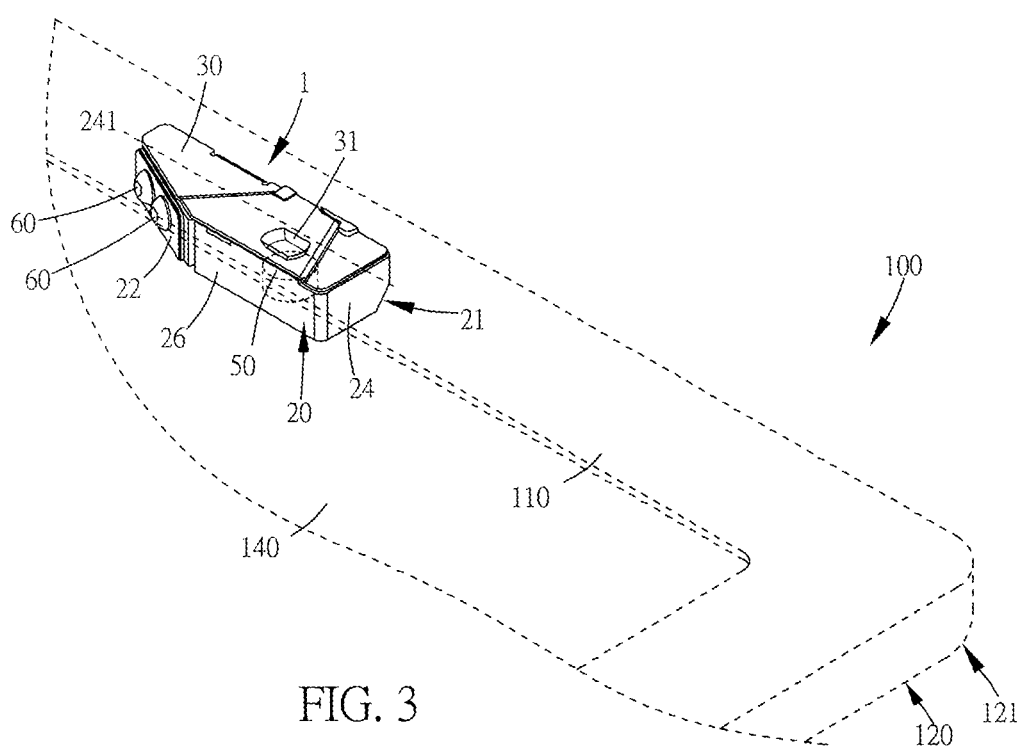
FIG. 3 is a partial schematic diagram of an electronic device according to the first embodiment of the present invention.
Figure 4:
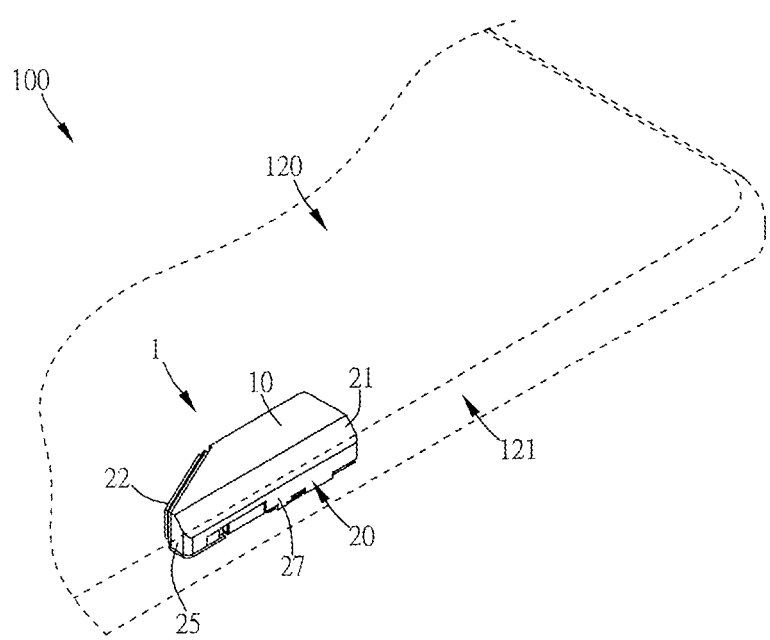
FIG. 4 is a partial schematic diagram of an electronic device from another angle according to the first embodiment of the present invention.
Figure 5:
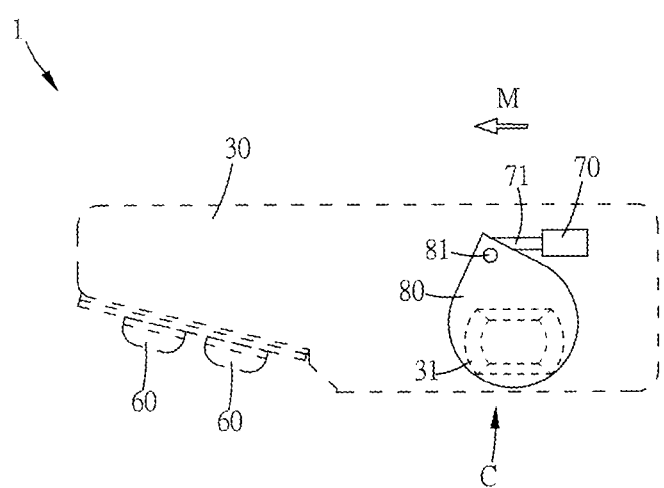
FIG. 5 is a schematic diagram of a blocking piece moved to a first position to block a top opening according to the first embodiment of the present invention.
Figure 6:
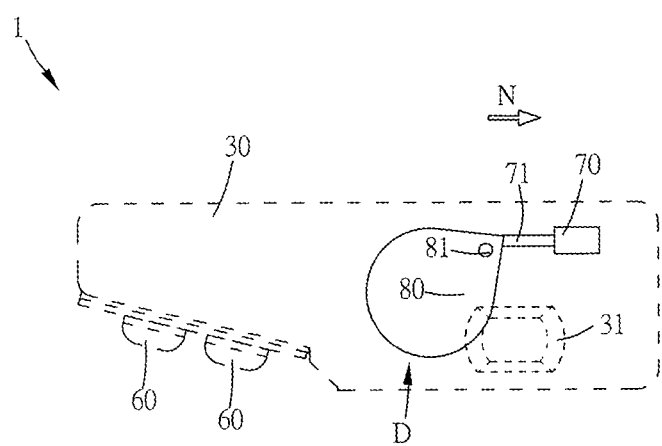
FIG. 6 is a schematic diagram of a blocking piece moved to a second position to expose a top opening according to the first embodiment of the present invention.

Refer to FIG. 2 to FIG. 6 showing an electronic device and a lens module thereof according to a first embodiment of the present invention. FIG. 2 shows a partial section diagram of an electronic device according to the first embodiment of the present invention. FIG. 3 shows a partial schematic diagram of an electronic device according to the first embodiment of the present invention. FIG. 4 shows a partial schematic diagram of an electronic device from another angle according to the first embodiment of the present invention. FIG. 5 shows a schematic diagram of a blocking piece moved to a first position to block a top opening according to the first embodiment of the present invention. FIG. 6 shows a schematic diagram of a blocking piece moved to a second position to expose a top opening according to the first embodiment of the present invention.

As shown in FIG. 2 and FIG. 3, in the first embodiment, an electronic device 100 is, for example, a laptop computer and includes a first housing 110, a second housing 120, an accommodating space 130, a screen module 140 and a lens module 1. The first housing 110 is a case facing a user when the laptop computer is opened. The first housing 110 includes a first through hole 111. The second housing 120 is a case having a back that faces the user when the laptop computer is opened. The second housing 120 is connected to the first housing 110 and includes an arc edge 121. The accommodating space 130 is formed between the first housing 110 and the second housing 120 and includes an arc area 131 having a position corresponding to the arc edge 121. The screen module 140 is located between the first housing 110 and the second housing 120 and is closely adjacent to the lens module 1. The screen module 140 is for displaying an image for the user to view.

In the first embodiment, the lens module 1 is capable of thoroughly utilizing an internal space of the electronic device 100, as well as reducing the size of the first housing 110 of the electronic device 100. The lens module 1 is located in the accommodating space 130 and has a shape matching the accommodating space 130. The lens module 1 is for photographing an image on one side of the first housing 110. The lens module 1 includes a bottom case 10, a side case 20, a top case 30, an internal space 40, a photography unit 50, two power connecting members 60, an actuator 70 and a blocking piece 80.

As shown in FIG. 2 to FIG. 4, in the first embodiment, the bottom case 10 is a case facing towards one side of the second housing 120 and appears substantially trapezoidal. The side case 20 is connected in an encircling manner to the bottom case 10 and is a loop-like case. The side case 20 includes an inclined surface area 21, a bevel angle area 22, a first short side 24, a second short side 25, a first long side 26 and a second long side 27. The inclined surface area 21 is connected to the second long side 27 and the bottom case 10, and the shape of the inclined surface area 21 can be a leveled inclined surface or an arc surface and substantially corresponds to the arc edge 121. Because the shape of the inclined surface area 21 corresponds to the arc edge 121, the inclined surface area 21 can smoothly be placed into the arc area 131. In addition, the inclined surface area 21 is located close to the arc edge 121, and therefore the arc area 131 can be properly utilized. The bevel angle area 22 is a sloped side, and two ends of the bevel angle area 22 are respectively connected to the first short side 25 and the first long side 26. Two ends of the first short side 24 are respectively the first long side 26 and the second long side 27, The first short side 24 is substantially perpendicular to the first long side 26 and the second long side 27 and has a first short side center line 241. Two ends of the second short side 25 are respectively the bevel angle area 22 and the second long side 27. The first long side 26 is parallel to the second long side 27. The bevel angle area 22, the first short side 24, the second short side 25, the first long side 26 and the second long side 27 are connected to one another to form a pentagonal loop structure.

In the first embodiment, the top case 30 is a case facing towards one side of the first housing 110 and appears substantially trapezoidal. The top case 30 is connected to the side case 20 and includes a top opening 31 aligned with the through hole 111 and the photography unit 50. The top opening 31 is deviated from the first short side center line 241.

In the first embodiment, the internal space 40 is formed between the bottom case 10, the side case 20 and the top case 30. The internal space 40 is for accommodating the photography unit 50 and other electronic components for operating the photography unit 50. The photography unit 50 is located in the internal space 40 and is aligned with the top opening 31, and the photography unit 50 is for receiving external light passing through the through hole 111 and the top opening 31 and entering the internal space 40 so as to photograph an image. Because the lens module 1 appears substantially trapezoidal, the internal space 40 correspondingly appears trapezoidal, and a lower area of the trapezoidal internal space 40 has a larger space. Thus, the photography unit 50 is designed to be closer to the lower area of the trapezoidal internal space 40, and the top opening 31 also corresponds to the position of the photography unit 50 and is deviated from the first short side center line 241.

In the first embodiment, the two power connecting members 60 are provided in the bevel angle area 22 of the side case 20 and are for powering the photography unit 50 and the actuator 70 by electric power acquired from a battery of the electronic device 100. Because the two power connecting members 60 are provided in the bevel angle area 22, the height of the power connecting members 60 does not exceed the planar extension of the first long side 26. As such, it is ensured that the overall volume of the lens module 1 is small enough to be suitably placed in a laptop computer having a small internal volume.

In the first embodiment, as shown in FIG. 3, FIG. 5 and FIG. 6, the blocking piece 80 is located in the internal space 40 and next to the top opening 31 and is linked with the actuator 70. The blocking piece 80 includes a pivotal portion 81, which is mutually pivotally connected to the top case 30. Accordingly, the blocking piece 80 can use the pivotal portion 81 as a rotation shaft to rotate relative to the top case 30 and is capable of rotating to a first position C, at which the top opening 31 and the photography unit 50 below the top opening 31 are blocked, or rotating to a second position D, at which the top opening 31 and the photography unit 50 below the top opening 31 are not blocked.

In one embodiment of the present invention, the actuator 70 is a bidirectional electromagnetic valve. A bidirectional electromagnetic valve is a valve having two sets of electromagnetic coils, wherein the two sets of electromagnetic coils cause the actuator 70 to respectively move in different directions according to the electric power received. The actuator 70 is provided in a lining layer of the top case 30 and is electrically connected to the power connecting members 60 to acquire electric power. The actuator 70 includes a connecting portion 71, which is connected to the blocking piece 80. When one of the electromagnetic coils of the actuator 70 receives electric power, the actuator 70 is electrically driven to move along a direction M and drives the blocking piece 80 to move to the first position C, at which the top opening 31 and the photography unit 50 are blocked. When the other of the electromagnetic coils of the actuator 70 receives electric power, the actuator 70 is electrically driven to move along a direction N and drives the blocking piece 80 to move to the second position D, at which the top opening 31 and the photography unit 50 are not blocked, such that the photography unit 50 is exposed to the exterior from the top opening 31. Accordingly, when the actuator 70 is electrically driven, the actuator 70 drives the blocking piece 80 to rotate between the first position C and the second position D relative to the top case 30. Since the bidirectional electromagnetic valve of the actuator 70 only needs to be supplied with electric power while starting to move along the directions M and N and no power supply thereto is needed in other periods, a power saving effect can also be achieved.

As shown in FIG. 2, FIG. 5 and FIG. 6, because the inclined surface area 21 of the side case 20 can be smoothly placed into the arc area 131 and is closely located to the arc edge 121, the arc area 131 can be properly utilized. That is to say, compared to the lens module 940 in FIG. 1, the lens module 1 of the present invention can be smoothly placed into the arc area 131 (as in FIG. 2). Thus, even if a first case length B of the first housing 110 is shorter than the first housing length A in FIG. 1, the first housing length B can still completely cover the lens module 1 in the accommodating space 130. Thus, an effect of thoroughly utilizing the internal space of the electronic device 100 can still be achieved, and the first housing length B of the first housing 110 of the electronic device 100 can be decreased to further decrease the material costs of the first housing 110 or to increase the size of the screen module 140. Further, with the design of the actuator 70 and the blocking piece 80, a user can selectively provide electric power to move the blocking piece 80 to the first position C, at which the top opening 31 and the photography unit 50 are blocked, to facilitate photographing, or move the blocking piece 80 to the second position D, at which the top opening 31 and the photography unit 50 are not blocked, such that the photography unit 50 cannot photograph external images, thereby achieving an effect of protecting the personal privacy of the user.

Figure 7:
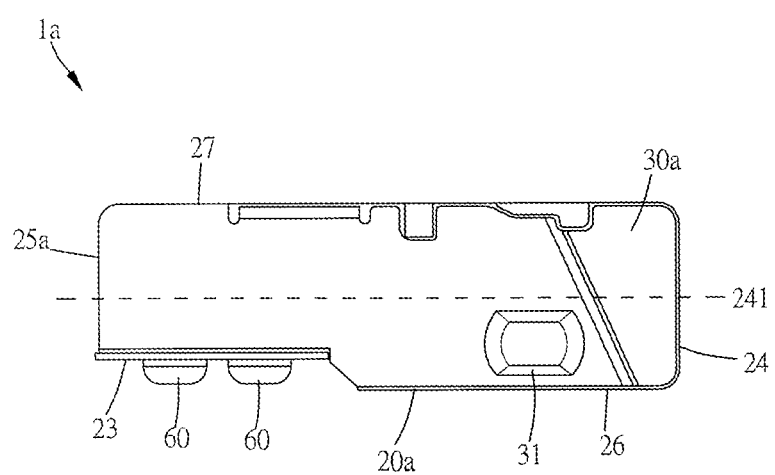
FIG. 7 is a schematic diagram of a lens module according to a second embodiment of the present invention.

A lens module according to a second embodiment of the present invention is described with reference to FIG. 7 below. FIG. 7 shows a schematic diagram of a lens module according to the second embodiment of the present invention.

As shown in FIG. 7, the second embodiment differs from the first embodiment in that, in a lens module 1a of the second embodiment, a side case 20a does not include a bevel angle area but further includes a recessed area 23, wherein the recessed area 23 is a plane recessed relative to the first long side 26. The shape of a top case 30a also changes correspondingly according to the shape of the side case 20a. The two power connecting members 60 are provided in the recessed area 23, and the height of the power connecting members 60 does not exceed the planar extension of the first long side 26, thus ensuring that the overall volume of the lens module 1a is small enough.

Figure 8:
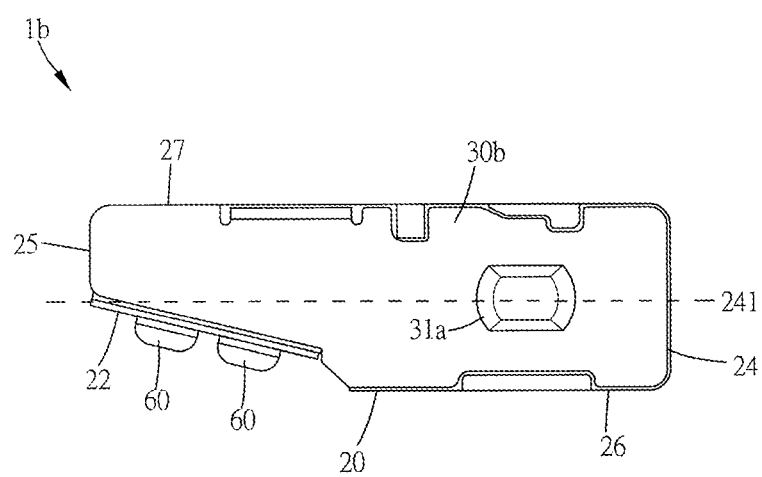
FIG. 8 is a schematic diagram of a lens module according to a third embodiment of the present invention.

A lens module according to a third embodiment of the present invention is described with reference to FIG. 8 below. FIG. 8 shows a schematic diagram of a lens module according to the third embodiment of the present invention.

As shown in FIG. 8, the third embodiment differs from the first embodiment in that, in a lens module 1b of the third embodiment, a top opening 31a of a top case 30b is located on the first short side center line 241, and the position of the photography unit (not shown) also corresponds to the top opening 31a and is located on the first short side center line 241.

With the structural designs of the lens modules 1, 1a and 1b of the present invention, the lens modules can thoroughly utilize the internal space of an electronic device, and the size of the first housing of the electronic device can be reduced to further decrease the material costs of the first housing or to increase the size of a screen module.

It should be noted that the above embodiments are described as examples of, rather than limitations to, the present inventions. For example, embodiments that do not depart from the fundamental structure of the present invention are to be encompassed within the scope of the claims of the present invention, and the scope of the present invention should be in accordance with the appended claims.

What is claimed is:

1. An electronic device, comprising:
a first housing, comprising a through hole;
a second housing, connected to the first housing, the second housing comprising an arc edge and a flat body, the flat body and the first housing are parallel, a side of the arc edge is connected to the flat body, and another side of the arc edge curves to connect to the first housing, and the arc edge comprises an arc portion inner surface;
an accommodating space, formed between the first housing and the second housing, the accommodating space comprising an arc area having a position corresponding to the arc edge; and
a lens module, located in the accommodating space and having a shape corresponding to the accommodating space, the lens module comprising:
a bottom case;
a side case, connected to the bottom case, the side case comprising an inclined surface area provided in the arc area and facing to the arc portion inner surface, wherein an upper side and a lower side of the inclined surface area touch the arc portion inner surface, and a gap is formed between the arc portion inner surface and the inclined surface area;

a top case, connected to the side case, the top case comprising a top opening aligned with the through hole and facing away from the arc edge;
an internal space, formed between the bottom case, the side case and the top case; and
a photography unit, located in the internal space and aligned with the top opening.

2. The electronic device as claimed in claim 1, wherein the lens module further comprises at least one power connecting member provided at the side case.

3. The electronic device as claimed in claim 2, wherein the side case further comprises a bevel angle area, in which the at least one power connecting member is provided.

4. The electronic device as claimed in claim 2, wherein the side case further comprises a recessed area, in which the at least one power connecting member is provided.

5. The electronic device as claimed in claim 1, wherein the side case further comprises a first short side, the first side has a first short side center line, and the top opening is deviated from the first short side center line.

6. The electronic device as claimed in claim 1, wherein the side case further comprises a first short side, the first short side has a first short side center line, and the top opening is located on the first short side center line.

7. The electronic device as claimed in claim 1, further comprising:
a screen module, located between the first housing and the second housing and close to the lens module.

8. The electronic device as claimed in claim 1, wherein the lens module further comprises an actuator and a blocking piece; the actuator is located in the internal space and is electrically driven to move along a first direction or a second direction; the blocking piece is located next to the top opening and is linked with the actuator; when the actuator moves along the first direction, the actuator drives the blocking piece to move to a first position so as to block the photography unit; when the actuator moves along the second direction, the actuator drives the blocking piece to move to a second position such that the photography unit is exposed to an exterior from the top opening.

9. The electronic device as claimed in claim 8, wherein the blocking piece further comprises a pivotal portion, the pivotal portion is mutually pivotally connected to the top case, the actuator comprises a connecting portion, and the connecting portion is connected to the blocking piece; when the actuator is electrically driven, the actuator drives the blocking piece to rotate between the first position and the second position relative to the top case.

10. A lens module, applied to an electronic device, the electronic device comprising a first housing, a second housing and an accommodating space, the first housing comprising a through hole, the second housing being connected to the first housing and comprising an arc edge and a flat body, the flat body and the first housing are parallel, a side of the arc edge is connected to the flat body, another side of the arc edge curves to connect to the first housing, and the arc edge comprises an arc portion inner surface, the accommodating space being formed between the first housing and the second housing and comprising an arc area having a position corresponding to the arc edge, the lens module being located in the accommodating space and having a shape corresponding to the accommodating space, the lens module comprising:
a bottom case;
a side case, connected to the bottom case, the side case comprising an inclined surface area provided in the arc area and facing to the arc portion inner surface, wherein an upper and a lower side of the inclined surface area touch the arc portion inner surface, and a gap is formed between the arc portion inner surface and the inclined surface area, wherein the side case further comprises a bevel angle area, and the bevel angle area is facing away the arc edge;
a top case, connected to the side case, the top case comprising a top opening aligned with the through hole and facing away from the arc edge;
an internal space, formed between the bottom case, the side case and the top case;
a photography unit, located in the internal space and aligned with the top opening; and
at least one power connecting member provided at the bevel angle area of the side case.

11. The lens module as claimed in claim 10, wherein the side case further comprises a first short side, the first side has a first short side center line, and the top opening is deviated from the first short side center line.

12. The lens module as claimed in claim 10, wherein the side case further comprises a first short side, the first short side has a first short side center line, and the top opening is located on the first short side center line.

13. The lens module as claimed in claim 10, wherein the electronic device further comprises:
a screen module, located between the first housing and the second housing and close to the lens module.

14. The lens module as claimed in claim 10, further comprising:
an actuator and a blocking piece;
wherein the actuator is located in the internal space and is electrically driven to move along a first direction or a second direction; the blocking piece is located next to the top opening and is linked with the actuator; when the actuator moves along the first direction, the actuator drives the blocking piece to move to a first position so as to block the photography unit; when the actuator moves along the second direction, the actuator drives the blocking piece to move to a second position such that the photography unit is exposed to an exterior from the top opening.

15. The lens module as claimed in claim 14, wherein the blocking piece further comprises a pivotal portion, the pivotal portion is mutually pivotally connected to the top case, the actuator comprises a connecting portion, and the connecting portion is connected to the blocking piece; when the actuator is electrically driven, the actuator drives the blocking piece to rotate between the first position and the second position relative to the top case.

16. A lens module, applied to an electronic device, the electronic device comprising a first housing, a second housing and an accommodating space, the first housing comprising a through hole, the second housing being connected to the first housing and comprising an arc edge and a flat body, the flat body and the first housing are parallel, a side of the arc edge is connected to the flat body, and another side of the arc edge curves to connect to the first housing, the accommodating space being formed between the first housing and the second housing and comprising an arc area having a position corresponding to the arc edge, and the arc edge comprises an arc portion inner surface, the lens module being located in the accommodating space and having a shape corresponding to the accommodating space, the lens module comprising:
a bottom case;
a side case, connected to the bottom case, the side case comprising only one inclined surface area provided in the arc area and facing to the arc portion inner surface, wherein an upper and a lower side of the inclined surface area touch the arc portion inner surface, and a gap is formed between the arc portion inner surface and the inclined surface area, wherein the side case further comprises a recessed area, and the recessed area is facing away the arc edge;

a top case, connected to the side case, the top case comprising a top opening aligned with the through hole;

an internal space, formed between the bottom case, the side case and the top case;

a photography unit, located in the internal space and aligned with the top opening; and at least one power connecting member provided at the recessed area of the side case.

* * * * *